(12) United States Patent
Blazer et al.

(10) Patent No.: US 9,297,975 B2
(45) Date of Patent: Mar. 29, 2016

(54) OPTICAL FIBER CABLE WITH PRINT PROTECTIVE OUTER SURFACE PROFILE

(71) Applicant: Corning Optical Communications LLC, Hickory, NC (US)

(72) Inventors: Bradley Jerome Blazer, Granite Falls, NC (US); Dana Craig Bookbinder, Corning, NY (US); David Wesley Chiasson, Edmonton (CA); Andrew S Dodd, Hickory, NC (US); David Henry Smith, Hickory, NC (US); Kenneth Darrell Temple, Newton, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

(21) Appl. No.: 14/193,206

(22) Filed: Feb. 28, 2014

(65) Prior Publication Data

US 2015/0023641 A1 Jan. 22, 2015

Related U.S. Application Data

(60) Provisional application No. 61/856,111, filed on Jul. 19, 2013.

(51) Int. Cl.
*G02B 6/255* (2006.01)
*G02B 6/44* (2006.01)
*B29D 11/00* (2006.01)

(52) U.S. Cl.
CPC ........ *G02B 6/4439* (2013.01); *B29D 11/00663* (2013.01); *B29D 11/00875* (2013.01); *G02B 6/4482* (2013.01)

(58) Field of Classification Search
CPC ........... G02B 6/4439; B29D 11/00663; B29D 11/00875

USPC .......................... 385/114, 128, 147; 264/1.29
See application file for complete search history.

(56) References Cited

U.S. PATENT DOCUMENTS 6,470,121 B2 * 10/2002 Mills et al. ..................... 385/114
6,731,844 B2 * 5/2004 Conrad et al. ................. 385/114

(Continued)

FOREIGN PATENT DOCUMENTS

| CN | 202067591 U | 12/2011 | ............... H01B 7/36 |
| EP | 2034492 A2 | 3/2009 | |
| EP | 2584390 A1 | 4/2013 | ............... G02B 6/44 |
| JP | 2006058771 A | 3/2006 | |

(Continued)

OTHER PUBLICATIONS

Patent Cooperation Treaty, International Search Report for PCT/US2014/046615, mail date Oct. 2, 2014, 11 pages.

*Primary Examiner* — Ellen Kim
(74) *Attorney, Agent, or Firm* — William D. Doyle (57) ABSTRACT

An optical communication cable includes a cable body having an outer surface, an inner surface, a channel defined by the inner surface and a longitudinal axis extending through the center of the channel. The outer surface of the cable body defines a profile feature such that the outer surface at the profile feature is asymmetric about the longitudinal axis. The profile feature having at least two peaks and at least one trough between the peaks, and the profile feature extends axially along at least a portion of the length of the outer surface of the cable body. The cable includes an optical transmission element located in the channel, and an ink layer positioned along an outer surface of the trough of the profile feature. The peaks are configured to limit contact of the ink layer with surfaces during installation and thereby act to protect the ink layer from abrasion.

19 Claims, 9 Drawing Sheets

(56) References Cited

U.S. PATENT DOCUMENTS

| | | |
|---|---|---|
| 7,050,688 B2 * | 5/2006 | Lochkovic et al. ............ 385/128 |
| 7,747,120 B2 * | 6/2010 | Seo et al. ...................... 385/128 |
| 2002/0009282 A1 * | 1/2002 | Grulick et al. ................. 385/147 |
| 2003/0012530 A1 * | 1/2003 | Yamasaki et al. ............. 385/109 |
| 2004/0001678 A1 | 1/2004 | Chiasson et al. |

FOREIGN PATENT DOCUMENTS

| | | | | |
|---|---|---|---|---|
| JP | 2007072051 A | 3/2007 | | |
| WO | 2005001537 A1 | 1/2005 | | |
| WO | WO 2005/001537 A1 | 1/2005 | ............... | G02B 6/44 |
| WO | WO 2011/150787 A1 | 12/2011 | ............... | G02B 6/52 |

* cited by examiner

FIG. 28

OPTICAL FIBER CABLE WITH PRINT PROTECTIVE OUTER SURFACE PROFILE

RELATED APPLICATIONS

This Application claims the benefit of U.S. Provisional Application No. 61/856,111, filed Jul. 19, 2013, which is incorporated by reference herein in its entirety.

BACKGROUND

The disclosure relates generally to optical communication cables and more particularly to optical communication cables including a print protective surface profile. Optical communication cables have seen increased use in a wide variety of electronics and telecommunications fields. Optical communication cables may contain or surround one or more optical communication fibers. The cable provides structure and protection for the optical fibers within the cable.

SUMMARY

One embodiment of the disclosure relates to an optical communication cable. An optical communication cable including a cable body having an outer surface, an inner surface, a channel defined by the inner surface and a longitudinal axis extending through the center of the channel. The outer surface of the cable body defines a profile feature such that the outer surface at the profile feature is asymmetric about the longitudinal axis. The profile feature having at least two peaks and at least one trough between the peaks, and the profile feature extends axially along at least a portion of the length of the outer surface of the cable body. The cable includes an optical transmission element located in the channel, and an ink layer positioned along an outer surface of the trough of the profile feature. The peaks are configured to limit contact of the ink layer with surfaces during installation and thereby act to protect the ink layer from abrasion.

An additional embodiment of the disclosure relates to an optical cable. The optical cable includes a cable body having an outer surface and a longitudinal axis, and the cable includes an optical transmission element located within the cable body. The cable includes an array of grooves formed in the outer surface of the cable, and each groove of the array includes a lower surface recessed below an outermost surface of the cable. The grooves of the array are positioned in a non-parallel position relative to the longitudinal axis of the cable body. The cable includes an ink indicia layer positioned on the outer surface of the cable body, and a portion of the ink indicia layer is adhered to the lower surface of at least one groove of the array of grooves.

An additional embodiment of the disclosure relates to a method of forming an optical cable with a print protecting outer surface. The method includes extruding a cable body over an optical fiber, and the cable body has an outer surface. The method includes applying an ink layer forming indicia to the outer surface of the cable body. The method includes contacting the outer surface of the cable body with a tool at the position of the ink layer to deform the outer surface of the cable body forming an profile feature in the outer surface of the cable body, and the ink layer is located within profile feature.

An additional embodiment of the disclosure relates to a method of forming an optical cable with a print protecting outer surface. The method includes extruding a cable body over an optical fiber, and the cable body has an outer surface. The method includes forming a profile feature by mechanically deforming the cable body following extrusion. The profile feature having a trough recessed below the outer surface of the cable body, and the profile feature extends axially along at least a portion of the length of the outer surface of the cable body. The method includes applying an ink layer forming indicia to a surface of the trough.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Referring generally to the figures, various embodiments of an optical communication cable are shown. In general, the cable embodiments disclosed herein include a surface-applied ink layer (e.g., an ink jet deposited ink layer) adhered to the outer surface of the body of the cable. To protect the surface-applied ink layer, the cable embodiments disclosed herein include a profile feature formed in the outer surface of the cable body that acts to protect the ink layer. Specifically, the profile feature may include a recess, groove or trough that has a surface that is located below the outer surface of the cable body adjacent to the recess, groove or trough. The recession of the ink and the material of the cable defining the outermost surfaces of the cable body adjacent the ink layer act as a buffer that limits contact of the ink layer with various surfaces during use or installation. By limiting the contact experienced by the ink layer, the profile feature acts to protect the ink layer from being damaged, abraded or worn off during the installation or use of the cable while still allowing the user to view the ink layer.

During a hot foil printing process (a typical printing process used for many fiber optic cables), the hot foil applied ink is embedded below the outer surface of the cable body due to the heating of the ink layer. In contrast to hot foil printing, a surface applied ink layer (e.g., an ink jet applied ink layer) is located on the outer surface of the cable body and thus, may be more susceptible to damage or wear during installation. The cable embodiments discussed herein include a formed surface profile feature with at least one recess or trough below the outer surface of the cable body such that the surface applied ink layer with the trough is located below the outer most surfaces of the cable body. Further, the profile features disclosed herein are localized profiles at the position of the ink layer such that the outer surface or perimeter of the cable body is asymmetrical about the longitudinal axis of the cable body (e.g., the profile feature is not a repeating pattern formed around the entire perimeter or circumference of the cable body). The asymmetry of the profile feature provides a tactile indicator that may assist during installation or repair by allowing the user to identify the location of the ink layer by touch which allows the user to more easily/efficiently reorient the cable to view the ink layer. This can be particularly useful when working with an installed cable in tightly packed, confined and/or poorly lit areas.

Referring to FIGS. 1-4, an optical communication cable, shown as cable 10, is shown according to an exemplary embodiment. Cable 10 includes a cable body, shown as cable jacket 12, and an indicia layer, shown as ink layer 14. Generally, ink layer 14 is deposited to form alphanumeric characters to provide various information regarding cable 10 (e.g., brand, size, cable type, etc.) or other non-alphanumeric indicia (e.g., measurement marks, ID color, etc.) In one embodiment, ink layer 14 may be formed from a white, titanium oxide based ink. In other embodiments, dye based inks of other colors (e.g., yellow, orange, red, etc.) can used particularly for cables in which the color of the cable jacket is a non-black color.

Figure 3:
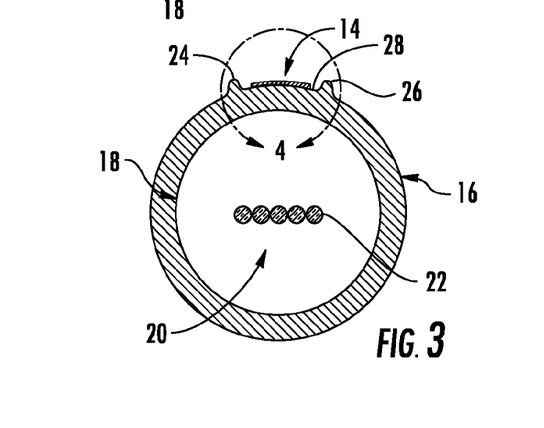
FIG. 3 is a cross-sectional view of the optical fiber cable of FIG. 1 according to an exemplary embodiment.

Cable jacket 12 has an outer surface 16 and an inner surface 18 that defines a channel or lumen 20. Generally, lumen 20 extends the length of cable jacket 12 between openings at opposing ends of cable 10. One or more optical transmission elements, shown as fiber optic ribbon 22, are located within lumen 20. In various embodiments, fiber optic ribbon 22 includes one or more optical fibers, and each optical fiber includes an optical core, a cladding layer surrounding the optical core and an outer protective layer (e.g., a polymer coating layer) surrounding the optical core and the cladding layer. In other embodiments, the optical transmission element may be one or more multi-core optical fibers. In these embodiments, multiple optical fibers (or multiple optical cores in the case of multi-core optical fibers) are located within the lumen 20 of cable 10. In various embodiments, as shown in FIG. 3, a gap or space may be present between the outer surface of ribbon 22 and inner surface 18 which allows for the positioning and realignment of ribbon 22 within cable 10 as cable 10 is moved and positioned during installation or in use. In various embodiments, cable jacket 12 may have a thickness between 0.5 mm and 5.0 mm.

In general, cable 10 provides structure and protection to fiber optic ribbon 22 during and after installation (e.g., protection during handling, protection from elements, vermin, etc.). In one embodiment, cable jacket 12 is formed from a single layer of extruded polymer material (e.g., a medium-density polyethylene material), and in other embodiments, cable jacket 12 may include multiple layers of materials where the outermost layer defines the outer surface of cable jacket 12. Further, cable 10 may include one or more strengthening member embedded within the material of cable jacket 12. For example, cable 10 may include an elongate strengthening member (e.g., a fiber or rod) that runs the length of cable jacket 12 and that is formed from a material that is more rigid than the material of cable jacket 12. In various embodiments, the strengthening member is metal, braided steel, glass reinforced plastic, fiber glass, fiber glass yarns or other suitable material.

Cable 10 includes a profile feature that acts to protect ink layer 14. Generally the profile feature is a shape, texture or pattern formed in outer surface 16 of cable jacket 12 that is located at the position of the ink layer. In the embodiment of FIGS. 1-4 the profile feature includes a first peak defined by buttress 24 and a second peak defined by buttress 26. A trough 28 is located between buttresses 24 and 26 such that the outer surface 32 of trough 28 is recessed below the outermost surfaces of buttresses 24 and 26.

As shown, buttresses 24 and 26 generally are raised ridges that extend radially outward from the generally cylindrical outer surface 16 of cable jacket 12. In the embodiment shown, buttresses 24 and 26 are substantially parallel ridges or projections that extend axially along at least a portion of the length of cable jacket 12. Further, as shown in FIG. 3, buttresses 24 and 26 and trough 28 are located centered around the 12 o'clock position in the orientation of FIG. 3. Thus, the localized positioning of buttresses 24 and 26 and trough 28 results in the outer perimeter and outer surface of cable jacket 12 that is asymmetrical about the longitudinal axis 30 of lumen 20 as shown in FIG. 3. As noted above, this asymmetry acts as a tactile identification feature that identifies the position of ink layer 14 along the surface of cable jacket 12.

Trough 28 includes an outer surface 32 that is located between buttresses 24 and 26. Ink layer 14 is adhered to the outer surface 32 of trough 28 such that ink layer 14 is located between buttresses 24 and 26 and below the outermost surfaces of buttresses 24 and 26. As shown, ink layer 14 forms alphanumeric characters that provides information related to the cable. In various embodiments, the information may include source identifying information, measurement marks, identification regarding the optical fibers within the cable, etc.

Figure 1:
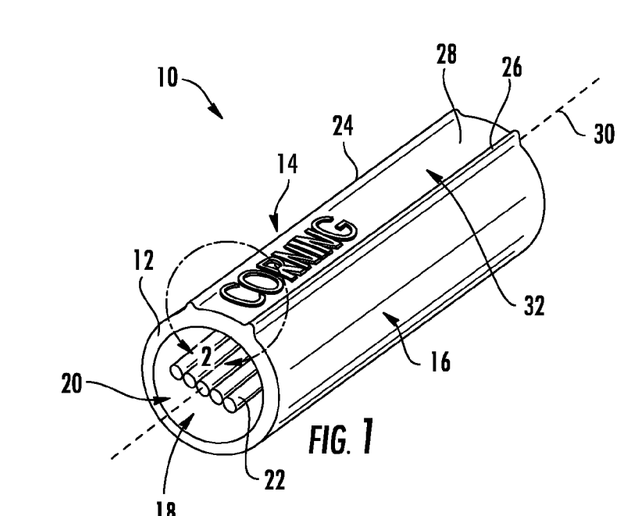
FIG. 1 is a perspective view of an optical fiber cable according to an exemplary embodiment.
Figure 2:
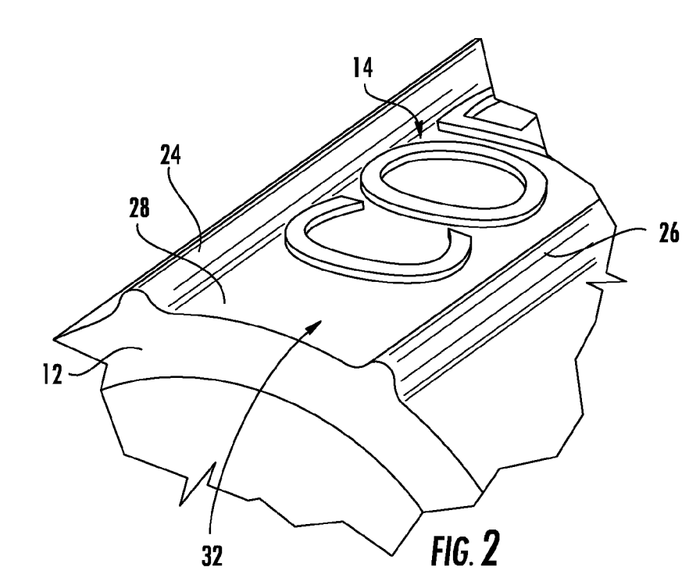
FIG. 2 is a detailed perspective view of a portion of the optical fiber cable of FIG. 1 according to an exemplary embodiment.
Figure 4:
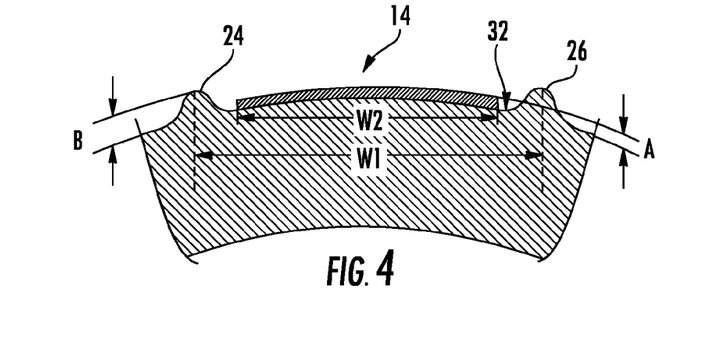
FIG. 4 is a detailed cross-sectional view of a portion of the optical fiber cable of FIG. 1 according to an exemplary embodiment.

As shown best in FIGS. 2 and 4, in the embodiment shown, ink layer 14 is a surface deposited ink layer adhered or bonded to outer surface 32 of trough 28. Thus, ink layer 14 extends outward from the outer surface 32 of trough 28. Generally, the outermost surface of ink layer 14 is above outer surface 32 of trough 28 but is below the outermost surface of buttresses 24 and 26. In the circular cross-sectional shaped embodiment of FIGS. 1-4, the radius measured at the outermost surface of ink layer 14 is greater than the radius measured at the outermost portion of outer surface 32. However, because the outermost surface of ink layer 14 is below the outermost surface of buttresses 24 and 26, buttresses 24 and 26 act to limit the direct contact ink layer 14 has with surfaces and objects (e.g., the surfaces of ducts receiving cable 10) during installation and in use, and as such, the profile acts to limit the amount of ink layer 14 that may be worn off during installation and in use.

In one embodiment, ink layer 14 is an ink jet deposited ink layer. In such embodiments, charged ink particles are sprayed from an ink jet nozzle to form the desired indicia (e.g., alphanumeric indicia, other types of indicia) of ink layer 14. In certain embodiments, cable jacket 12 is formed from a nonpolar material (e.g., a polyethylene material) that does not readily accept bonding of the charged ink jet droplets. In such embodiments, cable jacket 12 may be polarized (e.g., oxidized) by plasma treatment to create a surface that wets/bonds with the liquid ink jet droplets. In various embodiments, ink layer 14 is formed using solvent-based pigmented inks or UV curable pigmented inks. In other embodiments, ink layer 14 is formed through other ink deposition or printing techniques such as low indentation hot foil printing. In other embodiments, the alphanumeric characters of ink layer 14 may be formed using laser activated dyes. In yet other embodiments, cable 10 may include a non-ink based indicia layer. For example, the indicia layer may be an etched or embossed indicia layer, a surface adhered label, or laser ablation of carbon black within cable jacket 12 and subsequent foaming of the material of cable jacket 12 to create the contrast to form indicia.

In various embodiments, the relative sizing of ink layer 14 and the profile feature are selected to provide sufficient protection for ink layer 14. As shown in FIG. 4, ink layer 14 has a thickness shown as dimension A, and the profile feature has a depth B which is the distance between the outer most surface of buttresses 24 and 26 and outer surface 32 of trough 28. In various embodiments, thickness A of ink layer 14 is between 1% and 20% of depth B. In various embodiments, depth B is between 5 micrometers and 300 micrometers. In such embodiments, the thickness A of ink layer 14 is between 0.5 micrometers and 10 micrometers, specifically between 1 micrometers and 5 micrometers, and more specifically is about 3 micrometers. The thicknesses and depths discussed herein are generally the dimension of the layers measured in the radial dimension for the circular cross-sectional shaped cable embodiments specifically disclosed, but for embodiments having other cross-sectional shapes, the thicknesses discussed herein may generally be the dimension measured between inner and outer surfaces of the particular layer.

As shown in FIG. 4, the distance between the outermost point of buttress 24 and the outermost point of buttress 26 is shown as dimension W1, and the width (i.e., the circumferential dimension in the cylindrical embodiment of FIG. 4) of ink layer 14 is shown as dimension W2. In general, W1 is selected to be large enough to allow ink layer 14 to have a sufficient width W2 such that the ink layer is legible. However, W1 is also sized relative to profile depth B and ink layer width W2 to provide sufficient effective protection to ink layer 14. In various embodiments, the length W1 is between 3 mm and 5 mm. In other embodiments, length W1 is between 105% and 150% of the W2 of ink layer 14, and more specifically length W1 is between 110% and 130% of the W2 of ink layer 14. In another embodiment, length W1 is between 10 times and 2000 times the profile depth B, and more specifically is between 15 times and 1000 times the profile depth B.

In various embodiments, cable jacket 12 is an extruded thermoplastic material. In a specific embodiment, the material of cable jacket 12 is a medium-density polyethylene based material. In various other embodiments, cable jacket 12 may be a variety of materials used in cable manufacturing such as polyvinyl chloride (PVC), polyvinylidene difluoride (PVDF), nylon, polyester or polycarbonate and their copolymers. In addition, the material of cable jacket 12 may include small quantities of other materials or fillers that provide different properties to the material of cable jacket 12. For example, the material of cable jacket 12 may include materials that provide for coloring, UV/light blocking (e.g., carbon black), burn resistance, etc.

Figures 5, 6, 7, 8:
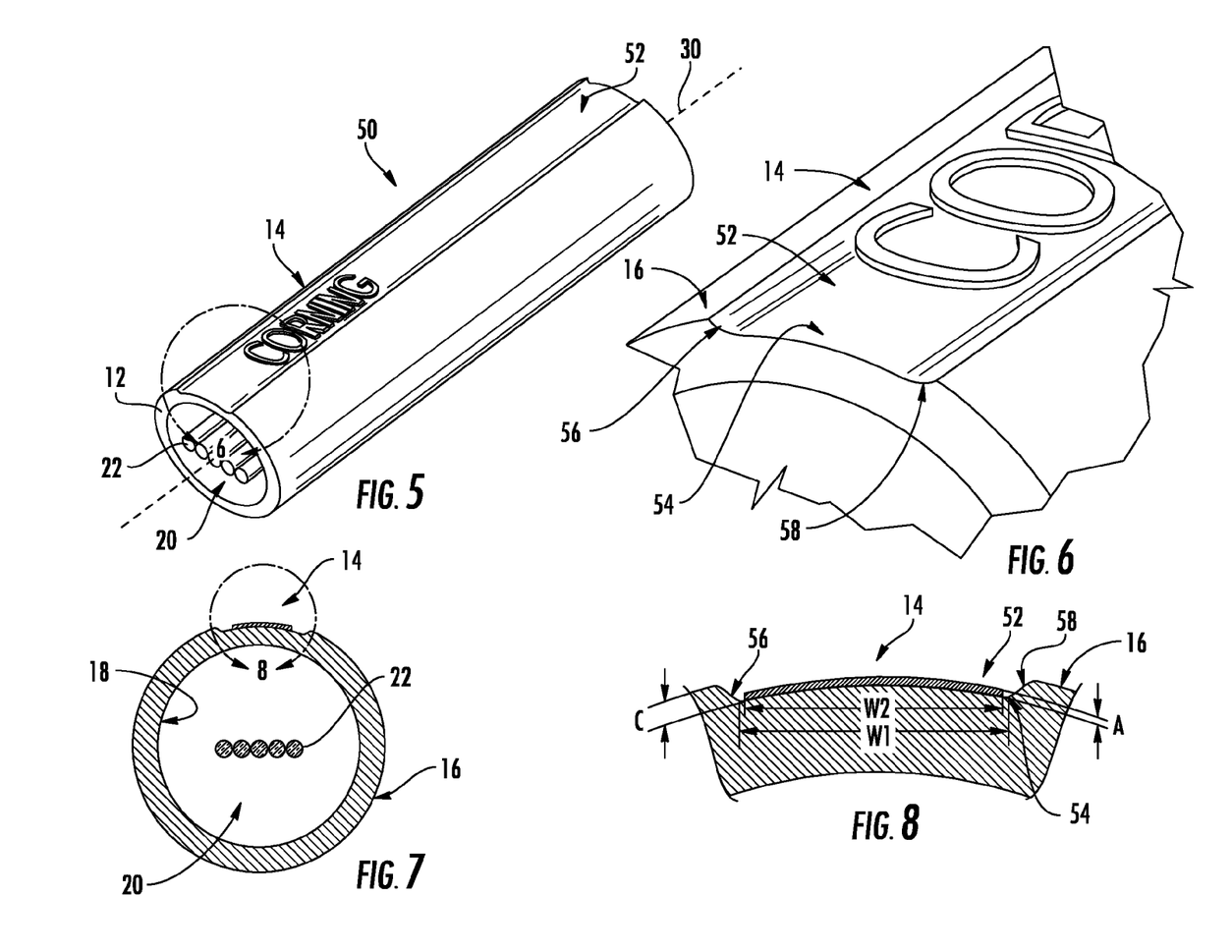
FIG. 5 is a perspective view of an optical fiber cable according to another exemplary embodiment.
FIG. 6 is a detailed perspective view of a portion of the optical fiber cable of FIG. 5 according to an exemplary embodiment.
FIG. 7 is a cross-sectional view of the optical fiber cable of FIG. 5 according to an exemplary embodiment.
FIG. 8 is a detailed cross-sectional view of a portion of the optical fiber cable of FIG. 5 according to an exemplary embodiment.
Figure 9:
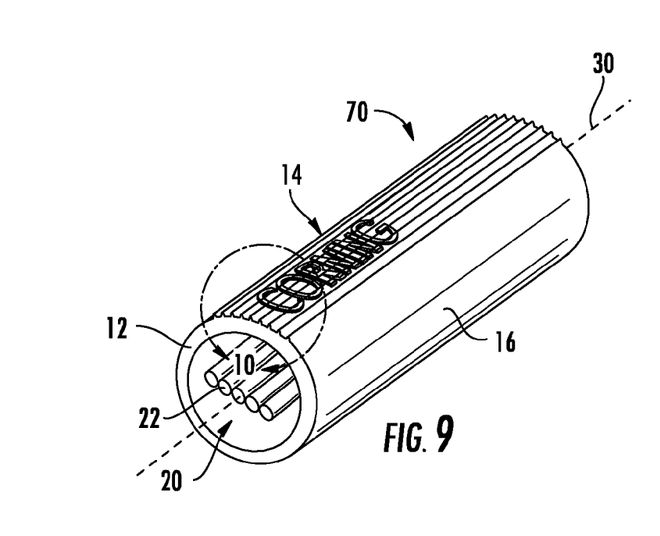
FIG. 9 is a perspective view of an optical fiber cable according to another exemplary embodiment.
Figure 10:
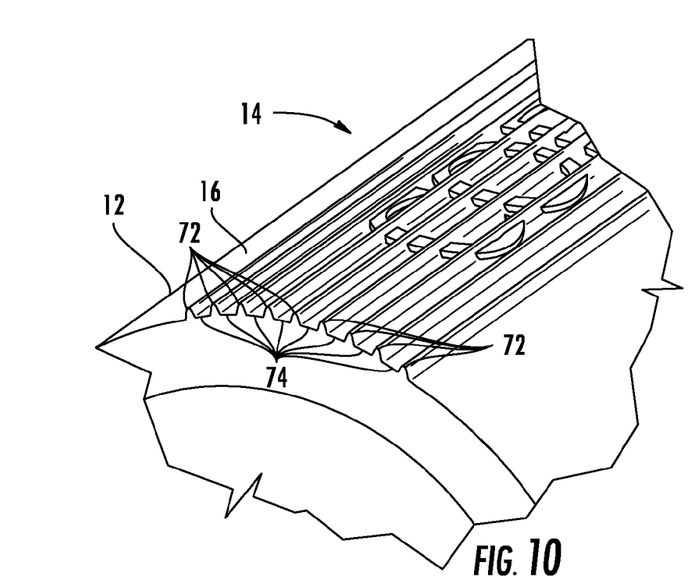
FIG. 10 is a detailed perspective view of a portion of the optical fiber cable of FIG. 9 according to an exemplary embodiment.

Referring to FIGS. 5-8, an optical communication cable 50 is shown according to an exemplary embodiment. Cable 50 is substantially the same as cable 10 except that cable 50 includes a profile feature that includes a trough shown as recess 52. Generally, recess 52 is a depression formed in cable jacket 12. Recess 52 includes an outer surface 54 and sidewalls 56 and 58. Ink layer 14 is positioned on outer surface 54 of recess 52. Generally, recess 52 is a localized depression located centered around the 12 o'clock position in the orientation of FIG. 7. Thus, the localized positioning of recess 52 results in the outer perimeter and surface of cable jacket 12 that is asymmetrical about the longitudinal axis 30 of lumen 20 as shown in FIG. 7. Recess 52 is a localized decrease in the outer diameter of the otherwise generally cylindrical outer surface 16.

Sidewall 56 extends outward away from outer surface 54 defining a peak of the profile feature where sidewall 56 joins to outer surface 16 of cable jacket 12. Thus, in this embodiment, the outer diameters at the outer most portion of sidewalls 56 and 58 are substantially the same as the outer most diameter of the generally cylindrical outer surface 16 of cable 50. Sidewall 58 is on the other side of outer surface 54 and extends outward away from outer surface 54 defining a second peak of the profile feature where sidewall 56 joins to outer surface 16 of cable jacket 12. As shown, sidewalls 56 and 58 are angled away from outer surface 54, such that the angle between outer surface 54 and sidewalls 56 and 58 is greater than 90 degrees, and more specifically is between 120 degrees and 140 degrees. Recess 52 generally includes a depth C and a width W1, as discussed above, and ink layer 14 includes a thickness A, as discussed above. In various embodiments depth C is the same as the various embodiments of depth B discussed above.

Referring to FIGS. 9-12, an optical communication cable 70 is shown according to an exemplary embodiment. Cable 70 is substantially the same as cable 10 except that cable 70 includes a profile feature that includes a plurality of ridges 72 that extend radially outward from the generally cylindrical outer surface 16 of cable jacket 12 such that the outermost surface of ridges 72 is located above the outermost surface 16 of cable jacket 12. In the embodiment shown, ridges 72 are substantially parallel ridges that extend axially along at least a portion of the length of cable jacket 12. A trough 74 is located between each of the adjacent ridges 72. Ink layer 14 is adhered to the outer surface 76 of each trough 74. In this embodiment, the profile feature includes more than two peaks and multiple troughs, and the portions of ink layer 14 that contribute to a single alphanumeric character are located on more than one trough 74 and span more than one ridge 72. In various embodiments, the amount or proportion of ink layer 14 that is located within troughs 74 is greater than the amount or proportion of ink layer 14 that is located on the outer surfaces of ridges 72.

Figure 11:
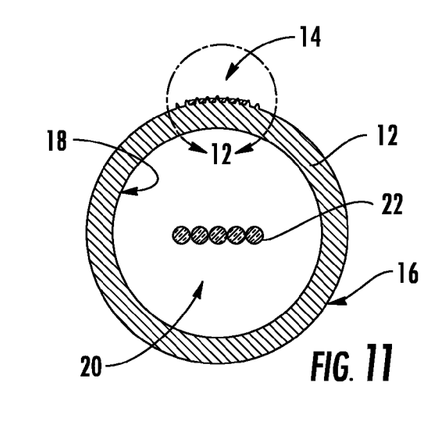
FIG. 11 is a cross-sectional view of the optical fiber cable of FIG. 9 according to an exemplary embodiment.
Figure 12:
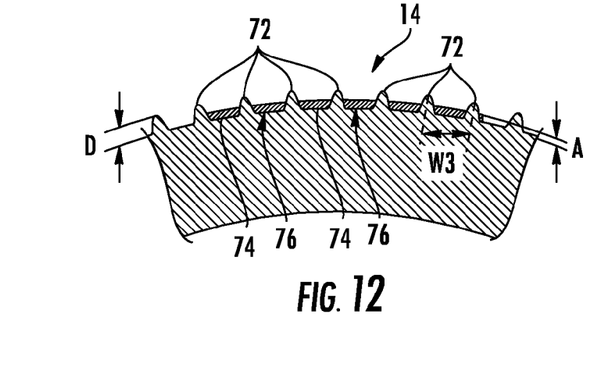
FIG. 12 is a detailed cross-sectional view of a portion of the optical fiber cable of FIG. 9 according to an exemplary embodiment.
Figure 13:
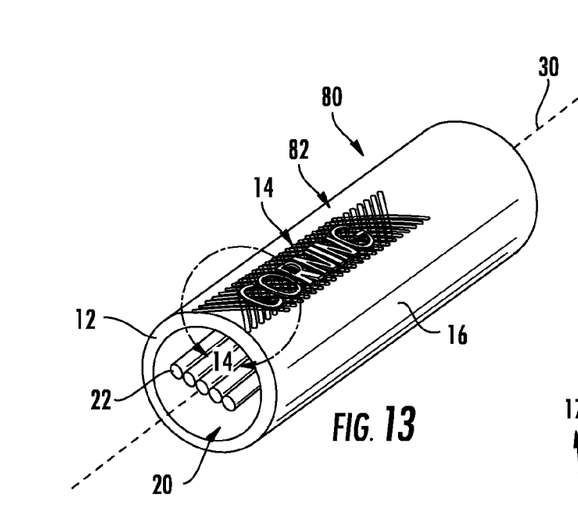
FIG. 13 is a perspective view of an optical fiber cable according to another exemplary embodiment.

Ridges 72 and troughs 74 are localized, centered around the 12 o'clock position in the orientation of FIG. 11. Thus, the localized positioning of ridges 72 results in the outer perimeter and surface of cable jacket 12 that is asymmetrical about the longitudinal axis 30 of lumen 20 as shown in FIG. 11. As noted above, this asymmetry acts as a tactile identification feature that identifies the position of ink layer 14 on the of cable jacket 12.

The profile feature of FIGS. 9-12 has a depth D, which is the distance between the outer most surfaces of ridges 72 and outer surface 76 of the adjacent trough 74. In various embodiments depth D is the same as the various embodiments of depth B discussed above, and ink layer 14 includes a thickness A as discussed above. Ridges 72 are also evenly spaced from one another, and in the embodiment shown, a width W3 is the distance between the outer most point of each adjacent ridge 72. In various embodiments, W3 is between 0.1 mm and 1.0 mm and more specifically is between 0.2 mm and 0.5 mm.

Figures 14, 16, 17:
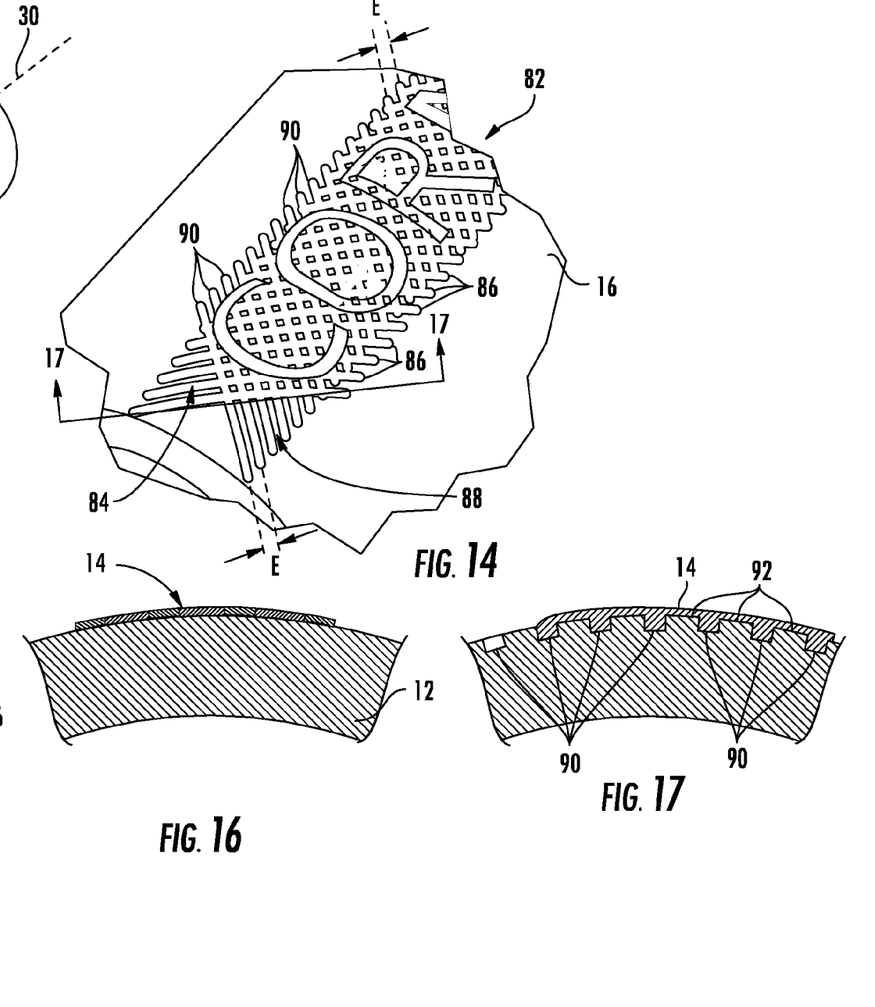
FIG. 14 is a detailed perspective view of a portion of the optical fiber cable of FIG. 13 according to an exemplary embodiment.
FIG. 16 is a detailed cross-sectional view of a portion of the optical fiber cable of FIG. 13 according to an exemplary embodiment.
FIG. 17 is a detailed cross-section view of the optical fiber cable of FIG. 13 showing an ink layer within grooves of a protection profile according to an exemplary embodiment.
Figure 15:
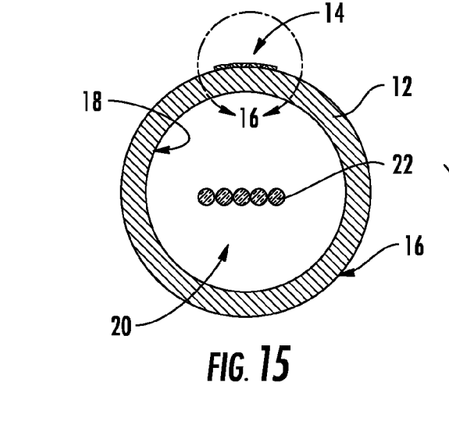
FIG. 15 is a cross-sectional view of the optical fiber cable of FIG. 13 according to an exemplary embodiment.
Figures 18, 19, 20, 21:
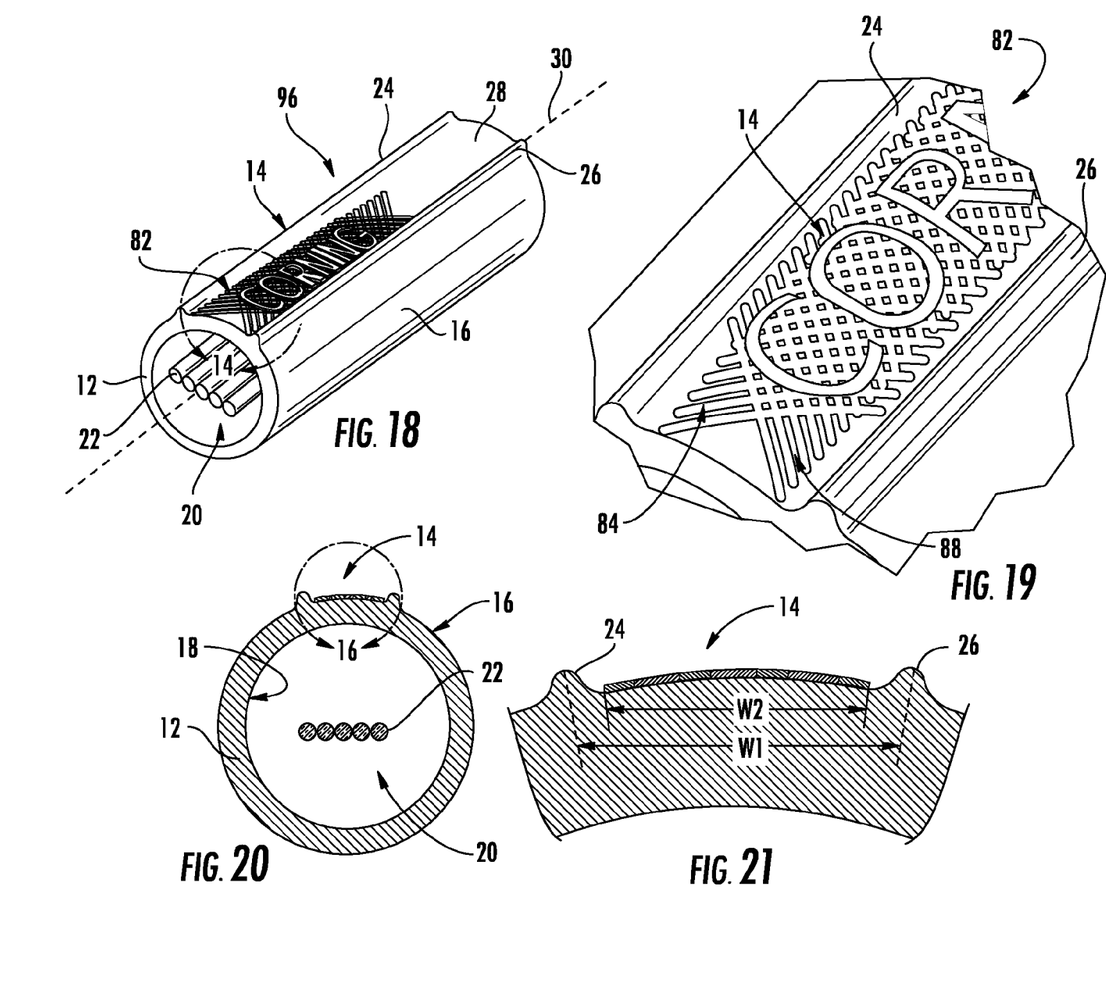
FIG. 18 is a perspective view of an optical fiber cable according to another exemplary embodiment.
FIG. 19 is a detailed perspective view of a portion of the optical fiber cable of FIG. 18 according to an exemplary embodiment.
FIG. 20 is a cross-sectional view of the optical fiber cable of FIG. 18 according to an exemplary embodiment.
FIG. 21 is a detailed cross-sectional view of a portion of the optical fiber cable of FIG. 18 according to an exemplary embodiment.
Figure 22:
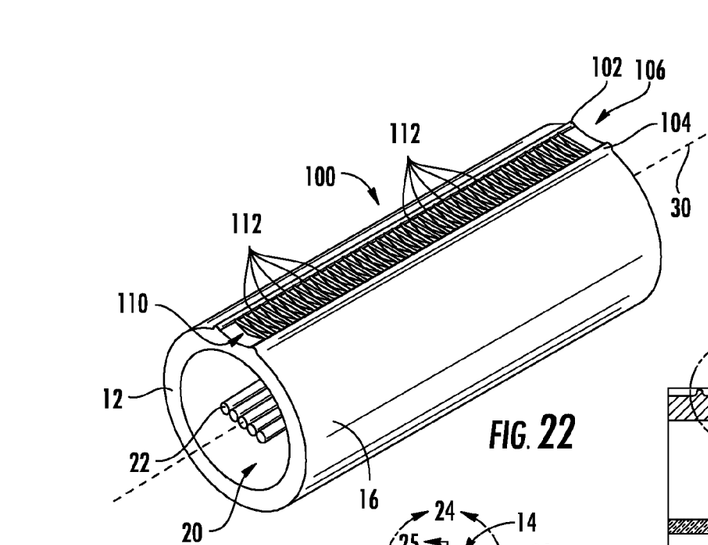
FIG. 22 is a perspective view of an optical fiber cable according to another exemplary embodiment.

Referring to FIGS. 13-17, an optical communication cable 80 is shown according to an exemplary embodiment. Cable 80 is substantially the same as cable 10 except that cable 80 includes a profile feature that includes an array of grooves 82 formed in outer surface 16 of cable jacket 12. Groove array 82 extends axially along at least a portion of the length of cable jacket 12. Groove array 82 is located centered around the 12 o'clock position in the orientation of FIG. 15. Thus, the localized positioning of groove array 82 results in the outer perimeter and surface of cable jacket 12 that is asymmetrical about the longitudinal axis 30 of lumen 20 as shown in FIG. 15. As noted above, this asymmetry acts as a tactile identification feature that identifies the position of ink layer 14 along the surface of cable jacket 12.

Array of grooves 82 includes a first set of parallel grooves 84 that includes a plurality of individual grooves 86, and array of grooves 82 includes a second set of parallel grooves 88 that includes a plurality of individual grooves 90. Grooves 86 and grooves 90 are positioned at a non-parallel (i.e., non-zero angle) relative to longitudinal axis 30. In the embodiment of FIGS. 13-17, grooves 86 are positioned at about a 45 degree angle to longitudinal axis 30, and grooves 90 are positioned at about a 45 degree angle to longitudinal axis 30, in the opposite direction. Grooves 86 and grooves 90 are also positioned at a non-parallel (i.e., non-zero angle) relative to each other. In this embodiment, grooves 86 are positioned at about a 90 degree angle relative to grooves 90.

Each groove 86 and 90 defines a trough having a lower surface and peaks located on either side of the trough. In this arrangement, the troughs of grooves 86 are positioned at an angle relative to the troughs of grooves 90 resulting in a cross-hatched pattern of troughs and ridges as shown in FIG. 14. In this embodiment, ink layer 14 is adhered to the outer surface of cable jacket 12 over groove array 82 such that portions of the ink layer are located on the outer surface of the bottom of the grooves, the groove sidewalls and the outer surfaces between the grooves. As shown for example in FIG. 17, portions of ink layer 14 are shown extending into grooves 90 such that the ink is adhered to the outer surface of the trough formed by the groove, and portions of ink layer 14 are located on the outermost surface portions 92 of groove array 82 that are located between grooves 90. The portions of ink layer 14 that contribute to a single alphanumeric character span multiple grooves as shown in FIG. 14. In this embodiment, sufficient amounts of ink layer 14 are located within grooves 86 or 90 such that the alphanumeric characters remain legible even if the portions of ink layer 14 on the outermost surface portions 92 between grooves 90 is worn off.

In various embodiments, grooves 86 and 90 have a depth between 5 micrometers and 300 micrometers. In addition, in various embodiments the spacing between grooves 86 of first set of grooves 84 and the spacing between grooves 90 of second set of grooves 86 is selected such that a sufficient amount of ink layer 14 is located within the grooves to maintain legibility if the portions of ink layer 14 on the outermost surfaces between grooves is worn off. In various embodiments, the spacing between adjacent grooves 90 and adjacent grooves 86 are the same and are shown by the dimension E. In various embodiments, dimension E is between 0.05 mm and 0.5 mm, and more specifically between 0.1 mm and 0.3 mm.

Referring to FIGS. 18-21, an optical communication cable 96 is shown according to an exemplary embodiment. Cable 96 is substantially the same as cable 10 except that cable 96 includes groove array 82 formed in the outer surface 32 of trough 28. In this embodiment, buttresses 24 and 26 act to limit abrasion of ink layer 14 as discussed above regarding the embodiment of FIGS. 1-4, and groove array 82 provides further protection for the portions of ink layer 14 located within the grooves of groove array 82 as discussed above regarding the embodiments of FIGS. 13-17.

Referring to FIGS. 22-28, an optical communication cable 100 is shown according to an exemplary embodiment. Cable 100 is substantially the same as cable 10 except as discussed herein. Cable 100 includes an ink protection profile feature that includes a first peak defined by buttress 102 and a second peak defined by buttress 104. A trough 106 is located between buttresses 102 and 104 such that the outer surface 108 of trough 106 is recessed below the outermost surfaces of buttresses 102 and 104.

Figure 23:
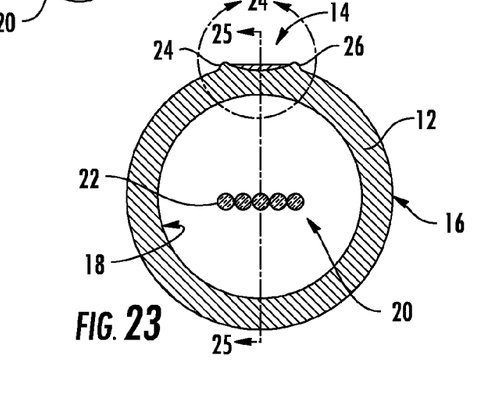
FIG. 23 is a cross-sectional view of the optical fiber cable of FIG. 22 according to an exemplary embodiment.

As shown, buttresses 102 and 104 are raised ridges that extend radially outward from the generally cylindrical outer surface 16 of cable jacket 12. In the embodiment shown, buttresses 102 and 104 are substantially parallel ridges or projections that extend axially along at least a portion of the length of cable jacket 12. Further, as shown in FIG. 23, buttresses 102 and 104 and trough 106 are located centered around the 12 o'clock position in the orientation of FIG. 23. Thus, the localized positioning of buttresses 102 and 104 and trough 106 results in the outer perimeter and surface of cable jacket 12 that is asymmetrical about the longitudinal axis 30 of lumen 20 as shown in FIG. 23. As noted above, this asymmetry acts as a tactile identification feature that identifies the position of ink layer 14 along the surface of cable jacket 12.

Trough 106 includes an outer surface 108 that is located between buttresses 102 and 104. Ink layer 14 is adhered to the outer surface 108 of trough 106 such that ink layer 14 is located between buttresses 102 and 104 and below the outermost surfaces of buttresses 102 and 104. As shown best in FIG. 24, outer surface 108 of trough 106 is primarily a concave surface, and in the embodiment shown is a continuous curved surface extending between buttresses 102 and 104. In various embodiments, outer surface 108 has a radius of curvature between 3 mm and 10 mm, and more specifically, between 4 mm and 6 mm.

Figure 24:
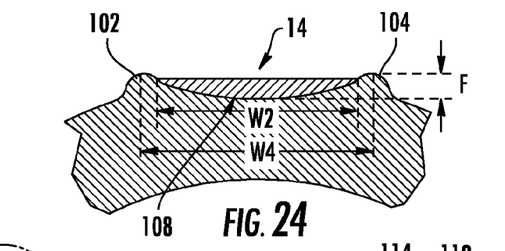
FIG. 24 is a detailed cross-sectional view of a portion of the optical fiber cable of FIG. 22 according to an exemplary embodiment.

As shown in FIG. 24, the distance between the outermost point of buttress 102 and the outermost point of buttress 104 is shown as dimension W4, and the width of ink layer 14 is shown as dimension W2. Further, the profile feature has a depth F, which is the distance between the lowest point of trough 106 and the outermost point of buttress 102 or 104. In general, W4 is selected to be large enough to allow ink layer 14 to have a sufficient width W2 such that ink layer 14 is legible, and W4 is also sized relative to profile depth F to provide sufficient protection to ink layer 14. In various embodiments, the length W4 is between 3 mm and 5 mm. In other embodiments, length W4 is between 105% and 150% of the W2 of ink layer 14, and more specifically length W4 is between 110% and 130% of the W2 of ink layer 14. In another embodiments, length W4 is between 5 times and 25 times the profile depth F, and more specifically is between 10 times and 20 times the profile depth F.

Figures 25, 26:
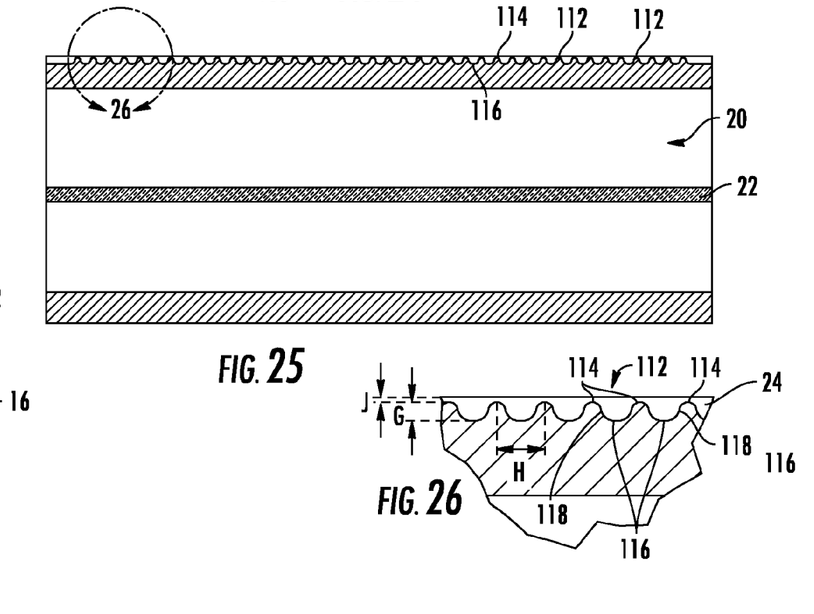
FIG. 25 is a longitudinal cross-sectional view of the optical fiber cable of FIG. 22 according to an exemplary embodiment.
FIG. 26 is a detailed cross-section view of a portion the view shown in FIG. 25 according to an exemplary embodiment.

In addition, the print protection profile of cable 100 includes a groove array 110 located on outer surface 108 of trough 106. Groove array 110 includes a plurality of parallel grooves 112 that are positioned at a non-parallel angle relative to longitudinal axis 30. In the embodiment shown, grooves 112 of groove array 110 are substantially perpendicular to longitudinal axis 30 and are substantially perpendicular to buttresses 102 and 104. As shown in FIGS. 25 and 26, each groove 112 includes peaks 114 located on opposite sides of a groove trough 116. Each groove 112 includes groove sidewalls 118 that extend between groove trough 116 and peaks 114. As shown in FIG. 26, grooves 112 are shaped such that the profile of each groove 112 is a continuously curved pattern of alternating peaks 114 and troughs 116 joined by sidewalls 118.

Figure 27:
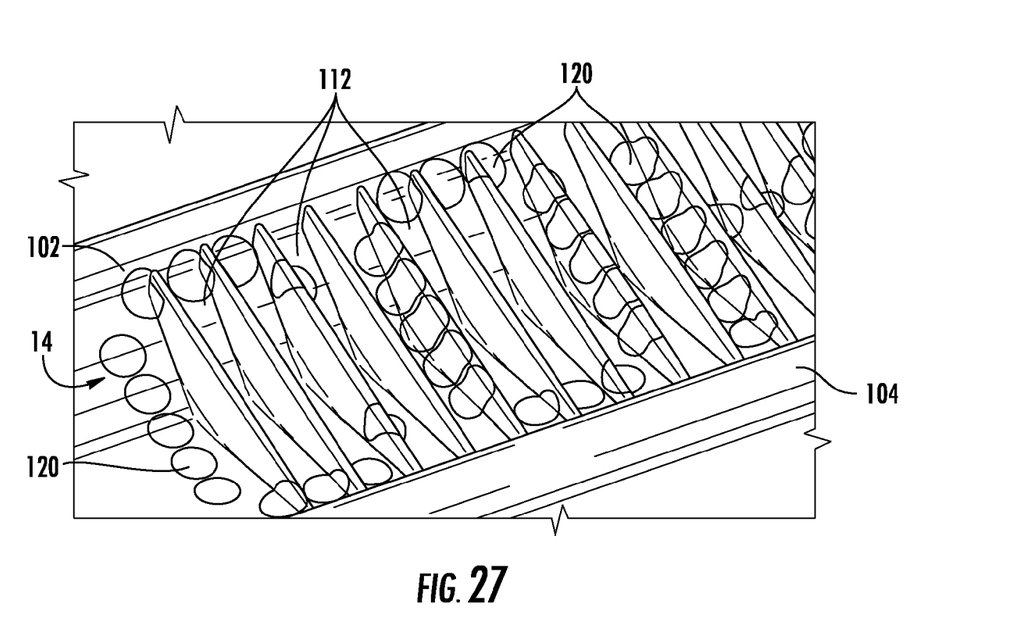
FIG. 27 is a detailed perspective view of a portion of the optical fiber cable of FIG. 22 showing an ink layer located on a profile feature according to an exemplary embodiment.
Figure 28:
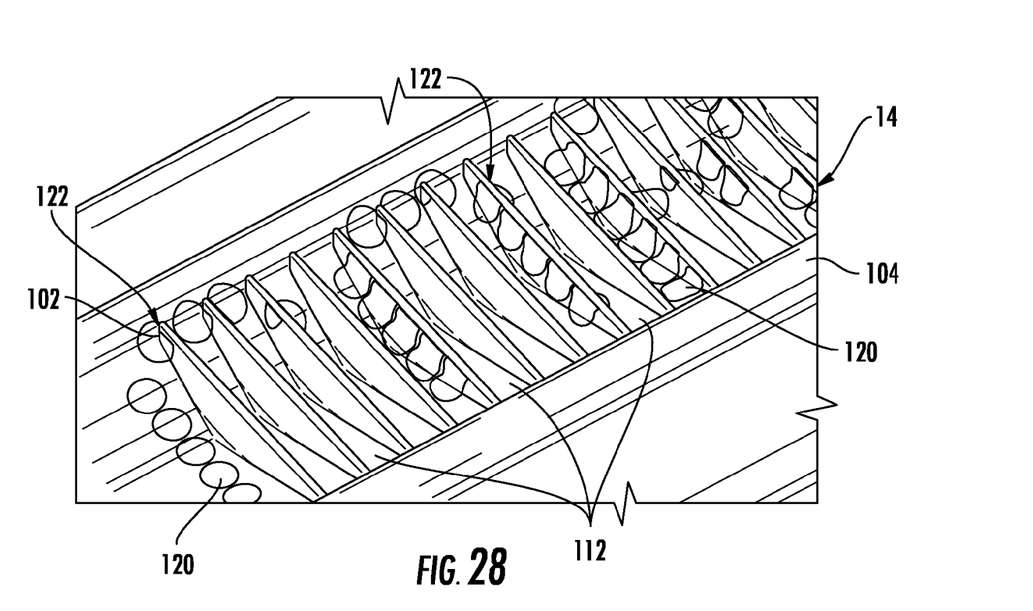
FIG. 28 is a detailed perspective view of a portion of the optical fiber cable of FIG. 22 showing the remaining portion of an ink layer within a profile feature following wear according to an exemplary embodiment.

As shown in FIGS. 27 and 28, ink layer 14 may be formed from a series of ink dots 120 that are located between buttresses 102 and 104. Ink dots 120 are adhered to the outer surface of cable jacket 12 over groove array 110 such that various ink dots are located on the surfaces of the groove troughs 116, the groove sidewalls 118 and the outer surfaces of groove peaks 114. The ink dots 120 that contribute to a single alphanumeric character span multiple grooves 112 as shown in FIG. 27. In this embodiment, sufficient numbers of ink dots 120 are located within grooves 112 (e.g., on the outer surface of groove troughs 116 or on groove sidewalls 118) such that the alphanumeric characters remain legible even if the portions of ink dots 120 on the outermost surfaces between grooves are worn off, as shown at 122 in FIG. 28.

Grooves 112 include a groove depth G which is the distance between the innermost point in groove trough 116 and the outermost point of groove peak 114. In various embodiments, groove depth G is between 0.05 mm and 0.2 mm. Grooves 112 also include groove spacing H which is the distance between the outer most points of adjacent groove peaks 114. In various embodiments, groove spacing H is between 0.1 mm and 0.3 mm. As shown in FIG. 26, grooves 112 are recessed below the outermost surface of buttresses 102 and 104, shown by the dimension J. In various embodiments, J is between 0.05 mm and 0.1 mm. In these embodiments, with grooves 112 recessed below the outermost surface of buttresses 102 and 104, buttresses 102 and 104 act to protect ink layer 14 from severe abrasion that may be caused by contact with larger structures and surfaces during the installation process, and grooves 112 may act to protect the portions of ink layer 14 located within the grooves from milder abrasion that may be caused by contact with dirt, dust, etc. during installation.

Figure 29:
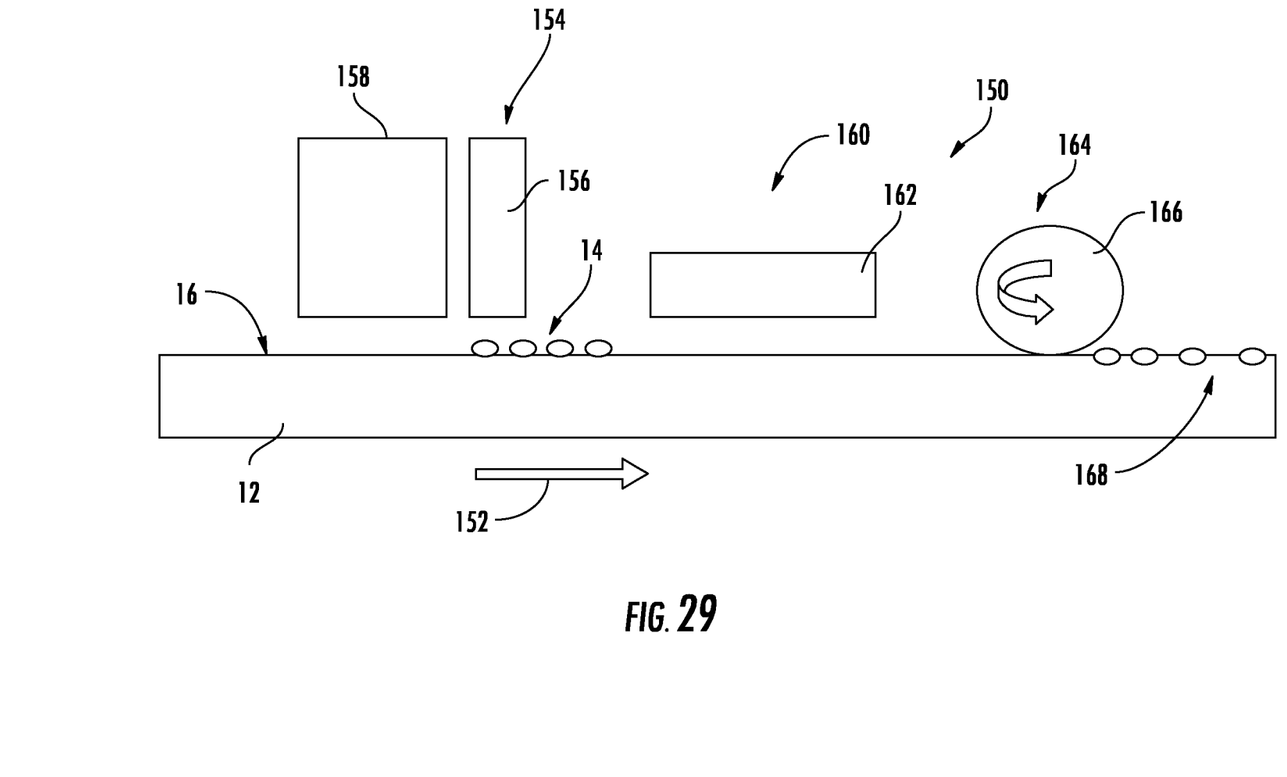
FIG. 29 shows a system forming a fiber optic cable with a print protective surface profile according to an exemplary embodiment.

Referring to FIG. 29, a system 150 for forming a fiber optic cable with a print protective surface profile and related method is shown according to an exemplary embodiment. Generally system 150 is configured to apply an ink layer onto an extruded cable body and then to form the print protection profile over the deposited ink layer.

First, a cable body is extruded over the optical fibers to create a cable, such as cable 10 discussed above. Following extrusion, the extruded cable body, such as cable jacket 12, traverses system 150 in the direction shown by arrow 152. At stage 154, cable jacket 12 passes through an ink applicator, shown as ink jet printer head 156. Ink jet printer head 156 deposits ink layer 14 onto outer surface 16 of cable jacket 12. In one embodiment, a pretreatment device 158 may be used to modify the material of cable jacket 12 to better adhere ink jet deposited ink layer 14. In one embodiment, pretreatment device 158 may be a plasma treatment device that oxidizes/polarizes outer surface 16 of cable jacket 12 to create a surface that the ink jet droplets from ink jet printer head 156 wet/adhere to. At stage 160, cable jacket 12 is heated by heating device 162. Heating device 162 softens the material of cable jacket 12 to facilitate formation of a surface profile at stage 164.

At stage 164, an embossing device 166 engages cable jacket 12 at the position of the deposited ink layer 14. Embossing device 166 mechanically deforms cable jacket 12 as embossing device 166 engages the heated cable jacket. In various embodiments, embossing device 166 includes a surface with a profile complimentary to the print protection profile to be formed in cable jacket 12, and as the profile of embossing device 166 engages cable jacket 12, embossing device 166 imprints cable jacket 12 with the desired profile. As shown at stage 168, because embossing device 166 engages cable jacket 12 after deposition of ink layer 14, embossing device 166 acts to push ink layer 14 into the protection profile such that ink layer 14 is recessed at least partially below the outermost surface of cable jacket 12.

In one embodiment, embossing device 166 may be a roller wheel that rotates as cable jacket 12 moves past station 164. In one embodiment embossing device 166 may have a heated outer surface to further assist in the formation of the profile in the surface of cable jacket 12. Embossing device 166 may be shaped and configured to produce any of the print protection profiles discussed herein.

Figures 30, 31:
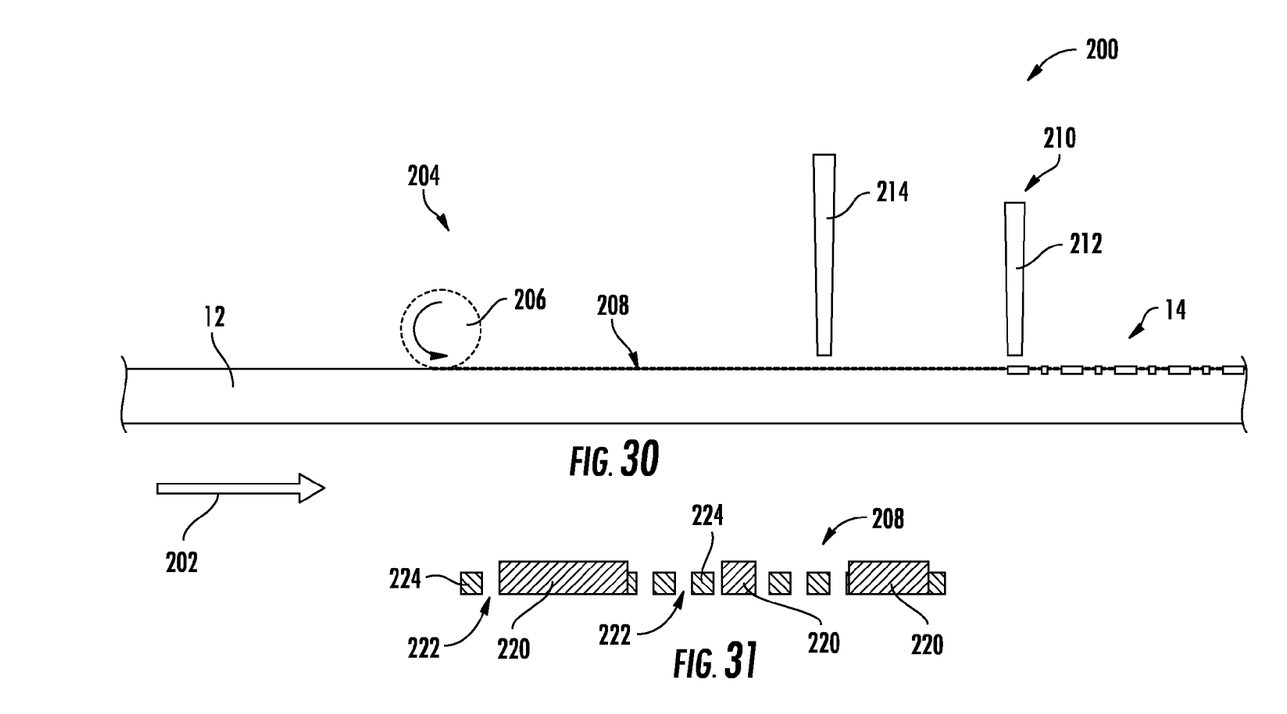
FIG. 30 shows a system forming a fiber optic cable with a print protective surface profile according to an exemplary embodiment.
FIG. 31 is a representative view of a print protection profile following application of an ink layer according to an exemplary embodiment.
Figure 32:
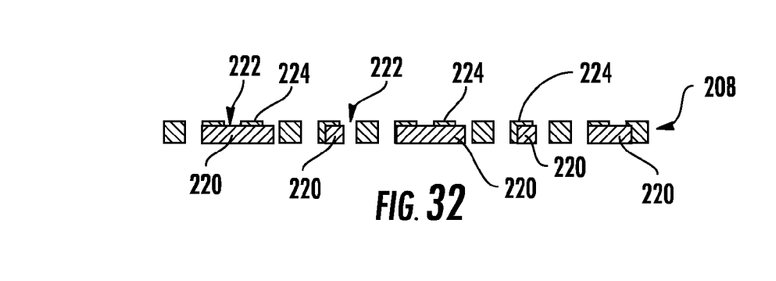
FIG. 32 is a representative view of a print protection profile following wear of outer portions of an ink layer according to an exemplary embodiment.

Referring to FIGS. 30-32, a system 200 for forming a fiber optic cable with a print protective surface profile and related method is shown according to an exemplary embodiment. Generally, system 200 is configured to form the print protection profile prior to deposition of the ink layer, then to deposit the ink layer onto the print protection profile. First, a cable body is extruded over the optical fibers to create a cable, such as cable 10 discussed above. Following extrusion, the extruded cable body, such as cable jacket 12, traverses system 200 in the direction shown by arrow 202. At stage 204, an embossing device 206 engages cable jacket 12 to form an asymmetrical print protection profile 208 in outer surface 16 of cable body 12. Embossing device 206 mechanically deforms cable body 12 as embossing device 206 engages the cable jacket. In various embodiments, embossing device 206 includes a surface with a profile complimentary to the print protection profile to be formed in cable jacket 12, and as the profile of embossing device 206 engages cable jacket 12 embossing device imprints cable jacket 12 with the desired profile. In one embodiment, embossing device 206 is a heated embossing wheel that rotates to engage outer surface 16 of cable jacket 12, and this contact in turn deforms the material of cable jacket 12 forming the desired print protection profile. In another embodiment, the print profile formation device may mechanically deform the surface of the cable body by removing material (e.g., scraping or etching) to form the print protection profile.

At stage 210, cable jacket 12 passes through an ink applicator, shown as ink jet printer head 212. Ink jet printer head 212 deposits ink layer 14 onto outer surface 16 of cable jacket 12 at the position of print protection profile 208. In one embodiment, a pretreatment device 214 may be used to modify the material of cable jacket 12 to better wet/adhere ink jet deposited ink layer 14 prior to ink layer deposition. In one embodiment, pretreatment device 214 may be a plasma treatment device that oxidizes/polarizes surface 16 of cable jacket 12 to create a surface that the charged ink jet droplets from ink jet printer head 212 adhere to. As shown schematically in FIG. 31, application of ink layer 14 over profile 208 results in portions 220 of ink layer 14 located both within troughs 222 and on peaks 224. As shown schematically in FIG. 32, if abrasion occurs, certain portions of ink layer 14 may be lost exposing additional peaks 224. However, because sufficient ink portions 220 are located within troughs 222 the alphanumeric characters or other indicia formed by ink layer 14 remains legible.

While the specific cable embodiments discussed herein and shown in the figures relate primarily to cables that have a substantially circular cross-sectional shape defining substantially cylindrical internal lumens, in other embodiments, the cables discussed herein may have any number of cross-section shapes. For example, in various embodiments, cable jacket 12 may have a square, rectangular, triangular or other polygonal cross-sectional shape. In such embodiments, the passage or lumen of the cable may be the same shape or different shape than the shape of cable jacket 12. In some embodiments, cable jacket 12 may define more than channels or passages. In such embodiments, the multiple channels may be of the same size and shape as each other or may each have different sizes or shapes.

The optical fibers discussed herein may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber.

Some or all of the following may be expressly, impliedly, or inherently disclosed above and/or in the Figures.

In contemplated embodiments, the surface of the surface profile may be roughened, such as with a texturing device, such as brass brush, a sander drum (e.g., using size 40 grit), a wire brush when or other devices. The process that roughens the surface may form a recess as disclosed above. On a micro-scale, the roughened surface is scored with grooves that have local troughs and peaks, as disclosed above, where rubbing contact may not remove ink located in the grooves of the roughened surface.

In contemplated embodiments, additional processes may be used in combination with the surface profile to improve bonding of the ink to the surface of the cable body. In some such embodiments, the surface of the cable body may be treated with plasma or flame to increase surface activation, thereby at least partially mitigating poor bonding qualities of jacket materials disclosed above, such as non-polar materials, such as polyethylene. In other such embodiments, bonding additives (e.g., maleic anhydride copolymer, ethylene acrylic acid copolymer, etc.) may be compounded into the jacket or applied to the surface thereof (e.g., tie layer) prior to application of the ink layer.

Similar to the embodiment shown in FIG. 14, in contemplated embodiments, the surface profile may include a dimpled surface, where the peaks shown in FIG. 14 are instead recesses in which to hold ink. In some such embodiments, the dimples may not be in a repeating pattern, but may instead be no-periodic, such as to increase protection of the intermeshed ink from otherwise wearing contact along a wide range of different directions.

Accordingly, any of the surface profile geometries disclosed herein may be arranged in non-repeating and/or non-periodic patterns within a profile feature localized to particular an ink layer. Similarly discrete surface profile geometries along the length of a particular optical cable may differ from one another in terms of the specific geometry of the respective profile feature. In some such embodiments, an ink layer in one part of the optical cable may have a profile feature similar to that shown in FIG. 10, while an ink layer in another part of the same cable may have a profile feature similar to that of FIG. 14, and yet another ink layer in a third part of the optical cable may have a profile feature similar to that shown in FIG. 22, but without buttresses 102, 104, similar to the profile feature of FIG. 14, which does not include buttresses.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents. As will be understood by those of ordinary skill in the art, features and attributes associated with embodiments shown in one of the Figures or described in the text relating to one of the embodiments may well be applied to other embodiments shown in another of the Figures and/or described elsewhere in the text.

What is claimed is:

1. An optical cable, comprising:
   a cable body having an outer surface and an inner surface defining a lumen, wherein the cable body has a profile feature formed on a curved section of the outer surface;
   one or more optical transmission elements located within the lumen; and
   an ink layer adhered to the outer surface of the cable body, wherein the ink layer forms alphanumeric characters that provide information related to the optical cable;
   wherein the profile feature is generally localized at the position of the ink layer, thereby providing asymmetry to the cable body in cross-section;
   wherein the profile feature includes at least one of a recess, a groove, and a trough that has a surface located below the outer surface of the cable body adjacent to the profile feature, and wherein the profile feature further includes at least one of a peak, a ridge, and a buttress adjoining the at least one of a recess, a groove, and a trough; and
   wherein the ink layer is formed from a series of ink dots that are adhered to the outer surface of the cable body over the groove array such that various ink dots are located on the surfaces of the troughs and the peaks, and wherein ink dots that contribute to a single alphanumeric character span multiple grooves, whereby the profile feature mitigates damage, abrasion, or wearing off of the ink layer due to limiting contact to the ink layer during use or installation of the optical cable.

2. The optical cable of claim 1, wherein the profile feature includes an array of grooves formed on the outer surface of the cable body, wherein each groove defines a trough having a lower surface and peaks located on either side of the trough.

3. The optical cable of claim 2, wherein the outermost surface of the ink layer above the surface of the troughs is below the outermost surfaces of the peaks adjoining the troughs, whereby the peaks limit direct contact of the ink layer by objects that may wear off the ink layer.

4. The optical cable of claim 2, wherein the cable body comprises a jacket formed from an extruded polymer material, wherein the jacket has a thickness between 0.5 and 5.0 millimeters, wherein the grooves have a groove depth between 0.05 and 0.2 millimeters and a groove spacing between 0.1 and 0.3 millimeters, and wherein the ink layer has a thickness of between 0.5 and 10 micrometers.

5. The optical cable of claim 2, wherein the proportion of the ink layer located within the troughs is greater than the proportion of the ink layer located on outer surfaces of the cable body between the troughs.

6. The optical cable of claim 5, wherein sufficient amounts of the ink layer are located within the troughs of the grooves such that alphanumeric characters formed by the ink layer remain legible even if portions of the ink layer on the outermost surfaces between the troughs are worn off.

7. The optical cable of claim 2, wherein the grooves of the array are positioned in a non-parallel position relative to the longitudinal axis of the cable body.

8. The optical cable of claim 7, wherein the grooves of the array are substantially parallel to each other and are substantially perpendicular to the longitudinal axis of the cable body.

9. The optical cable of claim 1, wherein the ink layer is a surface-applied ink layer located on the outer surface of the cable body as opposed to embedded below the outer surface of the cable body, and wherein the ink extends outward from an outer surface of the profile feature.

10. The optical cable of claim 9, wherein the jacket comprises a non-polar material that does not readily accept bonding of charged ink droplets.

11. The optical cable of claim 1, wherein the profile feature is not formed around the entire perimeter of the cable body, whereby the profile feature facilitates tactile identification of the ink layer.

12. An optical cable comprising:
    a cable body including an outer surface and a longitudinal axis;
    an optical transmission element located within the cable body;
    an array of grooves formed in the outer surface of the cable body, wherein each groove of the array includes a lower surface recessed below an outermost surface of the cable, wherein the grooves of the array are positioned in a non-parallel position relative to the longitudinal axis of the cable body; and
    an ink indicia layer positioned on the outer surface of the cable body, wherein a portion of the ink indicia layer is adhered to the lower surface of at least one groove of the array of grooves.

13. The optical cable of claim 12, wherein the grooves of the array are substantially parallel to each other and are substantially perpendicular to the longitudinal axis of the cable body.

14. The optical cable of claim 12, wherein each groove of the array of grooves includes a sidewall extending outward away from the lower surface of the groove and an outer surface extending from the sidewall between adjacent grooves of the array, wherein a portion of the ink indicia layer is located on the outer surface between adjacent grooves of the array.

15. The optical cable of claim 14, wherein the depth of each groove is between 0.05 mm and 0.2 mm, and the spacing between the outermost point of the outer surfaces of adjacent grooves of the array of grooves is between 0.1 mm and 0.3 mm.

16. A method of forming an optical cable with a print protecting outer surface, the method comprising steps of:
    extruding a cable body to surround an optical fiber, the cable body having an outer surface;
    applying an ink layer forming indicia to the outer surface; and contacting the outer surface of the cable body with a tool, after the extruding step, to deform the outer surface and thereby forming a profile feature on the outer surface of the cable body, wherein the ink layer is located on the profile feature.

17. The method of claim 16, wherein the outer surface of the cable body is heated prior to the contacting step.

18. The method of claim 16, wherein the profile feature results in the outer surface of the cable body being asymmetrical about a plane along a longitudinal axis of the cable body.

19. The method of claim 16, wherein the profile feature includes an array of grooves formed in the outer surface of the cable, wherein each groove of the array includes a lower surface recessed below an outermost surface of the cable, wherein the grooves of the array are positioned in a non-parallel position relative to the longitudinal axis of the cable body.

* * * * *